Oct. 6, 1970  J. CASAS SIMON  3,532,932
ARRANGEMENT FOR DISCHARGING STATIC ELECTRICITY
IN BODIES MOULDED FROM INSULATING MATERIAL
Filed Nov. 1, 1967  2 Sheets-Sheet 1
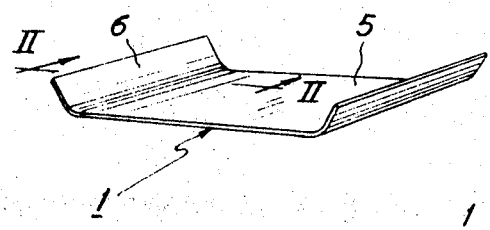
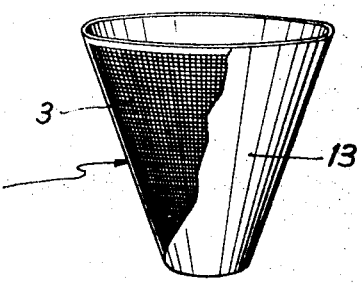
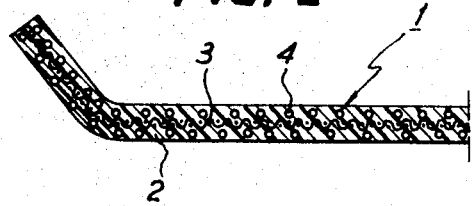
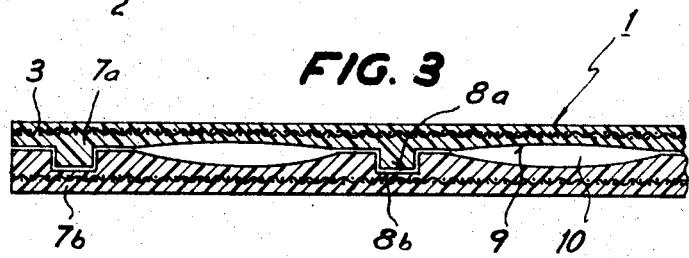
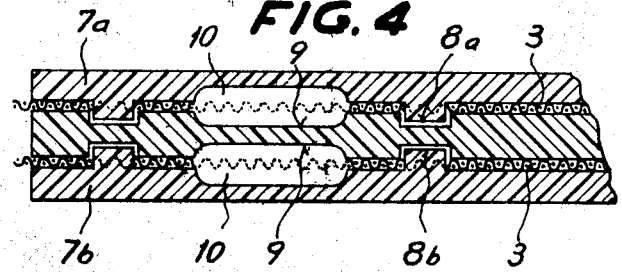
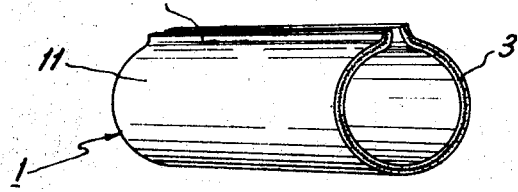

United States Patent Office 3,532,932
Patented Oct. 6, 1970

3,532,932
ARRANGEMENT FOR DISCHARGING STATIC ELECTRICITY IN BODIES MOULDED FROM INSULATING MATERIAL
Juan Casas Simon, Plaza General Martinez Anido 2, Sabadell, Spain
Filed Nov. 1, 1967, Ser. No. 679,795
Claims priority, application Spain, Nov. 2, 1966, 333,325
Int. Cl. H05f 3/00
U.S. Cl. 317—2      6 Claims

ABSTRACT OF THE DISCLOSURE

A discharge of static electricity to ground is facilitated by a structure in which the molded plastic material body of slight thickness as compared to the remaining dimensions thereof includes cooling channels extending therethrough for dissipating heat produced during frictional generation of static electricity in the body and metallic means disposed within the body and distributed throughout the major dimensions thereof for conducting static electricity generated in the body, the metallic means being adapted for connection to an electrical ground for discharging conducted static electricity to the ground.

---

This invention refers to an arrangement for discharging static electricity in bodies moulded from insulating material, obtained basically from synthetic resins, which bodies are to be used as guide rollers, anti-balloon separators, supports, industrial feed trays (e.g. for feeding stockings within a mill, from the exit of a thermal fixing chamber), panel and well coverings, and other elements in textile machines and mills; for the treatment of plastics in an attempt to avoid the effects caused by the charges of static electricity which are generated mainly by the action of friction, without excluding other actions, the effects of which cause electric shocks for the operators, sparks attraction of dust, lint and other items which render the normal working of the machines difficult, may cause accidents and have an influence on the quality of the finished products, as happens in the case of spun yarns and textile goods where the surface fibres stand up on end on being subject to a field of static, for example, the field produced by the separators on a spinning frame if they are made of synthetic material.

Thus, the aforementioned arrangement is specially applicable to spinning and weaving machines in view of the static electricity which is produced by friction between its members made of plastic material, wood, glass or other isolating materials and the textile fibres, which phenomenon causes deformation, bristling fibres, dirtiness caused by attraction of dust and other similar effects which are harmful to the fibres, spun yarns and textile goods; it also creates plant problems when certain liquids flow in plastic ducts, above all in cases of inflammable substances; it is also of interest to apply the new arrangement to cases where it is wanted to prevent the static electricity from attracting sheets, bands and threads together; and finally for covering, medicinal and other applications.

This present arrangement is characterised by the fact that a body of slight thickness as compared with its remaining dimensions, obtained by moulding plastic material contains in its interior a multitude of metallic members formed by a plurality of wires or metal strips conveniently distributed according to the major dimensions of the body, preferably in woven form, without excluding other forms such as meshes and perforated sheets, said members being electrically grounded.

Other aims and characteistics of the invention will be given in detail in the following desciption and with reference to the attached illustrative drawings. In the drawings:

FIG. 1 represents a perspective view of a moulded plastic body, according to the features of this invention, with a tray form for the passage of roving in a textile machine.

FIG. 2 represents a cross section of the body of FIG. 1 along the line II—II.

FIG. 3 represents a cross section of a body formed from two fitted plates as a variation of the body shown in FIG. 2, with internal channels.

FIG. 4 is a view similar to that of FIG. 3 for another embodiment of the invention composed of three plates.

FIG. 5 represents a perspective view of a moulded member which may be applied as a guide in a textile machine.

FIG. 6 represents a perspective view of a moulded member in the form of container for use as a container for inflammable liquids.

Figure 7:
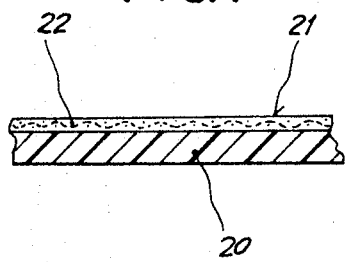
FIG. 7 represents a surface provided with a plastic layer incorporating in its interior woven metal members.

Plastic materials having antielectrostatic properties by addition of such products as sulfonates, triisopropanolamine, quaternary ammonium salts and the like are already known. But such plastics are short-lasting since the additives degrade them and accelerate the aging thereof.

On the other hand, members for causing the discharge of static electricity in bodies or members of an insulating nature on the basis of thin sheets, rollers or other elements of brass, copper, aluminum, iron, steel, lead or other materials which are more or less good conductors are also known.

One object of this invention is to provide for a considerable reduction of the weight of the members produced in comparison with those fitted with solid metal parts at the same time as the oxidizing chemical agents which attack metals are perfectly neutralized. An important advantage also is the fact that the industrial production of these parts is notably simpler and cheaper in comparison with the classical metallurgical process at the same time as the fact that the part does not lose any solidity in its structure since the internal cloth reinforces it considerably.

The new arrangement is based on the production of some laminar members manufactured by moulding thermoplastic or thermosetting synthetic plastic material, including synthetic rubbers blended with synthetic plastics or which have reacted with them, manufactured by the known arts or casting, extrusion, injection, compression, projection, blowing or any combined technique, adapted to allow the installation of a grounded reinforcement or metal cloth, being a good heat and electricity conductor, inside said members.

Among others, the following thermoplastic materials are suitable: cellulose acetate, P.V.C., polystyrene, polyolefins, polyfluorethylene, polymethacrylates, polyamides, polycarbonates, acrylonitrilobutadienostyrene, polysulfones and synthetic or blended rubber. Among the thermosetting: phenoplastics, aminoplastics and polyesters.

As good conducting materials which may form continuous or discontinuous internal reinforcements in the form of cloth, meshes, etc, we can quote iron, steel, aluminium, copper, lead, etc.

Small amounts of auxiliary products such as hardners, plastifiers, gas generators, dust eliminators, etc, may be added to the above mentioned materials.

A body 1, in its simplest embodiment, comprises a sheet 2 of plastic material into which is incorporated, at the time of moulding, a metallic reinforcement formed from a metal cloth 3 which extends along the major dimensions. In order to lighten the weight some cavities 4 are formed by way of a gas bubble generator.

In the embodiment shown in FIGS. 1 and 2 reference is made to a tray measuring 32 x 36 x 0.18 cms., having a base 5 and raised sides 6, to be used as a bed surface in a machine for obtaining textile yarns, said tray being made of methyl polymethacrylate with a 16-meshes-per-inch metallic cloth produced from galvanised iron wire having a 0.5 mm. diameter. This cloth remains unaffected by humidity or corrosive agents and is of infinite duration since it is protected by the plastic surrounding it.

The body 1 of FIG. 3 comprises two plates 7a and 7b provided with matching means 8a and 8b on opposite faces to allow mutual engagement. At the same time, other symmetrical depressions 9 produce internal cooling channels 10. Each plate has its metal cloth 3.

In FIG. 4, another body 1 is shown formed by three plates 10 facing in pairs with surfaces provided with matching ridge 8a and groove 8b. Each plate has a metal cloth 3 stuck to one of its surfaces. In this case, the projections 8a pass through the cloth 3. Also, longitudinal ducts are formed for cooling the member 1 which is heated by the accumulation of static electricity.

The cloth 3 may cover the whole extension of the body and even extend beyond the edges as is shown in FIG. 4 and it is fixed to its respective plate by suitable adhesives. This body is suitable for making supports for machines to prevent the formation of electrostatic charges.

The example shown in FIG. 5 refers to a body 1 moulded in the form of a tube 11 with a longitudinal opening 12 with jutting edges and comprising a metal cloth 3 made of aluminium, for the passage of a bundle of fibres running through in the spinning process in such a way as the electricity generated by the friction is eliminated.

The container of FIG. 6 comprises a body 1, e.g. with a frustoconical member 13, provided with a metal cloth 3 formed from copper wires. This body is suitable for holding inflammable liquids so that the static electricity generated by the movement of the liquid when it is poured into the container is discharged thereby avoiding the danger of fire by prevention of sparks. These containers may also be produced by the combination of two truncated cone pieces fitted one inside the other and each with its cloth 3.

The same bodies 1 may be moulded to form panels for covering walls on which dust will not settle since it ceases to be attracted by the electrostatic charges, which are discharged as explained above.

In all the above examples, the static electricity discharge capacity is reduced if the metal reinforcements or metal cloths 3 are not grounded.

Another embodiment of the invention is given in the following example:

A surface 20 (FIG. 7), which can be a wall, a panel or the like, is covered by a layer of plastic material 21 provided with metal cloth elements 22. Thereby, the above mentioned advantages with reference to the elimination of static electricity will be obtained.

Figure 8:
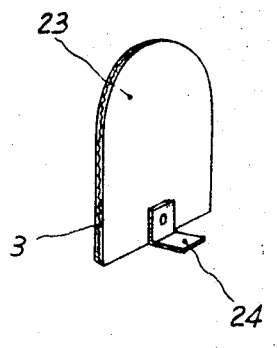
FIG. 8 represents an anti-balloon separator with an associated bracket connected to the inner woven metal cloth and grounded.
Figure 10:
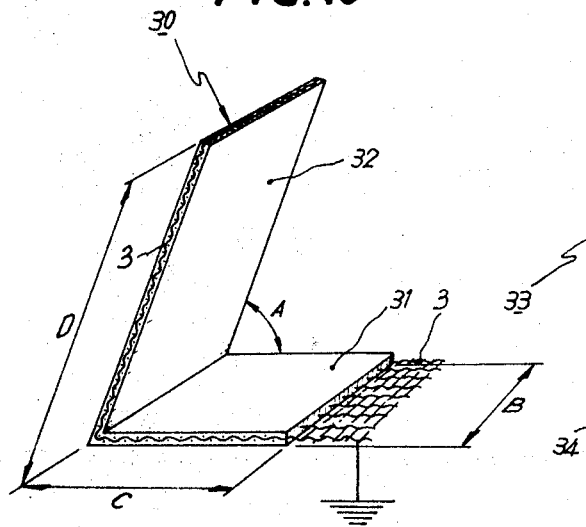
FIG. 10 represents a perspective diagrammatic view of a folded, reinforced plastic sheet with a grounded woven metal cloth, as a device for measuring the value of the electrostatic discharge from cloths, sheets and similar items.

In the case of spinning and twisting machines or frames, the problem arises that the balloon formed by the yarn when being wound on the spindle sometimes rubs on some parts, called anti-balloon separators, situated between two contiguous spindles which parts, being made of plastic material, build up electrostatic charges which attract dust, lint and other particles. An electrostatic field is thus created, which affects the yarn to be wound by dirtying it and/or causing the surface fibres to bristle whereby an irregular yarn is produced. For this reason a separator 23, according to FIG. 8, has been made within which a metal reinforcement or metal cloth 3 is embedded, said metal reinforcement or metal cloth 3 being connected to a metal part 24 which, while is a support means for the separator, produces at the same time a ground connection for the metallic reinforcement.

Figure 9:
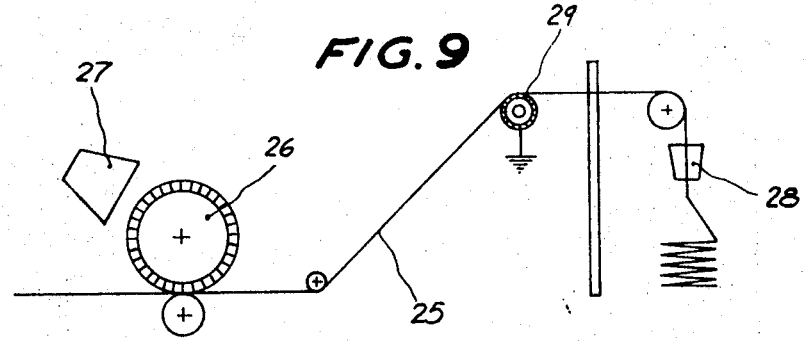
FIG. 9 is a diagrammatic view of a cloth brushing section in a shearing machine containing the electrostatic discharge device according to this invention.

Another embodiment of the invention relates to a brushing section of a cloth shearing machine, according to FIG. 9, which works on a pure felted wool cloth 25 at the rate of 16 metres per minute. These shearing machines, also known as pile cutters for velvet, etc., have one or several brushing rollers 26 with an extractor 27, which brush roller produces as a result of friction an electrostatic charge in the cloth 25, which must be eliminated before the cloth is folded, so as to obtain a more even folding and avoid the operators receiving static discharges. For this purpose, a fixed roller 29, measuring 2200 x 150 x 3 mm. is situated before the folding device 28, which fixed roller is composed of a sheet of methyl methacrylate containing in its interior a metal reinforcement according to the invention which reinforcement has been grounded by way of a suitable conductor means, which eliminates the electrostatic charges from the cloth which rubs over said roller.

Another application of the invention, which is not shown because of its extreme simplicity, is the obtaining by the processes usual in the art of a film or sheet of plastic material which incorporates within itself a small plurality of elements of metal cloth obtained from metal wires with diameters in the order of microns, which sheets are cut into strips which are then twisted to obtain threads like paper, raffia etc., threads, which threads have anti-electrostatic qualities either because of the difficulty in becoming charged or the ease of discharge.

Another application is to form covers or chambers for discharging the electrical tensions created in patients by the nervous system, whereby on the cessation of such tensions, the patient is provided with comfort. Such chambers are preferably cylindrical and have a height of 2 meters and a diameter of 1.5 metres.

The metal cloths 3 may be replaced by mesh or nets or even by perforated sheets, always on the basis of good conductor metals with or without treatment.

In order to appreciate the effect of the electrostatic discharge in articles made from reinforced plastic, an adaptation of the Standard AATCC–115–1965–T of the American Association of Textile Chemists and Colorists, extracted from the encyclopedia of said association, 1966 edition (Tentative Test Method) was adopted.

According to the adaptation of this standard test, a plastic bracket 30 made from reinforced plastic and having a dihedral shape with a angle A of 70° and a base 31 with a width B of 10 cms. and length C of 15 cms. whilst the other side 32 has the same width and is 30 cms. long along side D. The metal cloth reinforcement is grounded.

The experiments according to the adaptation of said standard test consist in applying a cloth to side 32 and fastening said cloth to the upper edge, said cloth being subjected to friction in order to charge it electrostatically, which makes it adhere to said sloping surface. The time the cloth takes to break free from said surface and adopt the vertical position suspended from the above-mentioned top edge is measured.

When a plastic bracket 30 without reinforcement is used, the adherence time of the wooden cloth averaged 11 seconds. When the bracket 30 has a 1:½ ratio between the plastic and the metal, and the metal reinforcement is composed of an aluminium cloth with the crossover points welded, said cloth being made from 0.5 mm. diameter threads and having 16 meshes per inch, the breakaway time was reduced to 3 seconds. If a 1:¼ plastic to metal ratio without welding in the crossover points is adopted, the time in question rises to 4 seconds.

It has been proved experimentally that the better the grounding means, the better is the discharge or greater the difficulty against electrification. Without the ground connection, this effect is reduced by approximately 30%.

Figure 11:
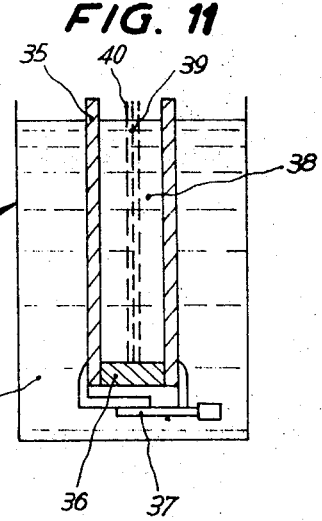
FIG. 11 represents a plant for the manufacture of plastic devices with metal reinforcement according to the invention.

The manufacture of bodies of reinforced plastic according to the invention is feasible through the device illustrated in FIG. 11, which consists of a container 33 holding a water bath 34 at 80° C. in which glass plates 35 are submerged vertically and held apart by separators 36 made of rubber to form a container by way of clamping means 37. In the space formed by the plates 35 and their base 36, a methyl methacrylate monomer plus polymeriser is placed. In this liquid mass 38 an aluminium cloth 39 is placed between two sheets of plastic material such as a polyamide or other material.

The liquid monomer turns viscose after 2 or 3 hours and causes an exothermic reaction. The water mass which initially acted as heating means controls the reaction.

From the above and in accordance with the experiments performed, it results that it is extremely beneficial for obtaining the best results the fact that the metal wires are face to face and parallel if possible, in order to obtain an electric condenser effect, as well as the fact that the distance between the active surface of the arrangement and the metal reinforcement be less than 4 mm. and the fact that the plastic material be as little hygroscopic as possible.

What I claim is:

1. An arrangement for avoiding buildup of static electricity charges by facilitating the discharge of static electricity to ground comprising a molded plastic material body having a slight thickness as compared with its remaining dimensions, means defining longitudinal grooves extending through said body for forming cooling channels therein and thereby for dissipating heat produced during frictional generation of static electricity in said body, and electrically conductive metallic means disposed within said body and distributed relative thereto throughout the major dimensions thereof for conducting static electricity generated in said body, said metallic means being adapted for connection to an electrical ground for discharging conducted static electricity thereto.

2. An arrangement according to claim 1 wherein said body comprises a sheet and said metallic means comprises a woven metal wire cloth embedded in said sheet and substantially coextensive with the major dimensions thereof.

3. An arrangement according to claim 1 wherein said body comprises a plurality of superimposed plates joined together.

4. An arrangement according to claim 3 wherein said metallic means comprises a plurality of woven metal wire cloths correlated in number to the number of said plates, each of said cloths being secured to one of said plates.

5. An arrangement according to claim 4 wherein said plates are joined together by cooperative projections and grooves thereon.

6. An arrangement according to claim 3 wherein said plates are joined together by cooperative projections and grooves thereon and wherein said metallic means comprises at least one woven metal wire cloth penetrated by said projections and grooves.

References Cited

UNITED STATES PATENTS

| | | | |
|---|---|---|---|
| 2,822,509 | 2/1958 | Harvey | 317—2 |
| 3,189,676 | 6/1965 | Muller | 317—2 X |
| 3,235,772 | 2/1966 | Gurin | 317—2 |

J D MILLER, Primary Examiner

WILLIAM J. SMITH, Assistant Examiner

U.S. Cl. X.R.

317—262